(12) United States Patent
Enyeart

(10) Patent No.: US 11,285,801 B2
(45) Date of Patent: Mar. 29, 2022

(54) ISOLATION FLANGE

(71) Applicant: Daniel Ray Enyeart, Gladstone, OR (US)

(72) Inventor: Daniel Ray Enyeart, Gladstone, OR (US)

( * ) Notice: Subject to any disclaimer, the term of this patent is extended or adjusted under 35 U.S.C. 154(b) by 0 days.

(21) Appl. No.: 16/421,031

(22) Filed: May 23, 2019

(65) Prior Publication Data

US 2019/0275880 A1 Sep. 12, 2019

Related U.S. Application Data

(63) Continuation-in-part of application No. 15/276,801, filed on Sep. 27, 2016, now Pat. No. 10,486,527.

(51) Int. Cl.
*B65D 41/00* (2006.01)
*B60K 15/03* (2006.01)
*B23K 101/00* (2006.01)

(52) U.S. Cl.
CPC ........ *B60K 15/03* (2013.01); *B23K 2101/006* (2018.08); *B60K 2015/03032* (2013.01); *B60K 2015/03256* (2013.01)

(58) Field of Classification Search
CPC ........ B60K 15/03; B60K 15/01; B60K 15/04; B60K 2015/02032; B60K 2015/03256; B60K 2015/03118; B60K 2015/03125; B60K 2015/03453; B60K 2015/0477; B65D 25/10; B65D 25/20; F16L 37/107
USPC .......... 292/256.6, 307 R; 277/630, 637, 644; 220/661, 304, 378, 601, 293, 319, 4.14, 220/4.12
See application file for complete search history.

(56) References Cited

U.S. PATENT DOCUMENTS

| | | | | |
|---|---|---|---|---|
| 2,441,009 A | * | 5/1948 | Cunningham | ........ F16L 41/086 285/200 |
| 6,415,941 B1 | * | 7/2002 | Huse | ...................... B29C 41/04 220/4.13 |

* cited by examiner

*Primary Examiner* — Don M Anderson
*Assistant Examiner* — Elizabeth J Volz
(74) *Attorney, Agent, or Firm* — Ingrid McTaggart

(57) ABSTRACT

The present invention relates to an isolation flange for a fuel tank assembly, and a process of manufacturing the same, for use in commercial vehicles, and more particularly, to an isolation flange for a fuel tank assembly that provides a crumple zone positioned between a component receiving base and a wall of a fuel tank, such that the crumple zone insulates the component receiving base from deformation during drop tests and harsh environmental driving conditions to which the fuel tank is subjected.

18 Claims, 2 Drawing Sheets

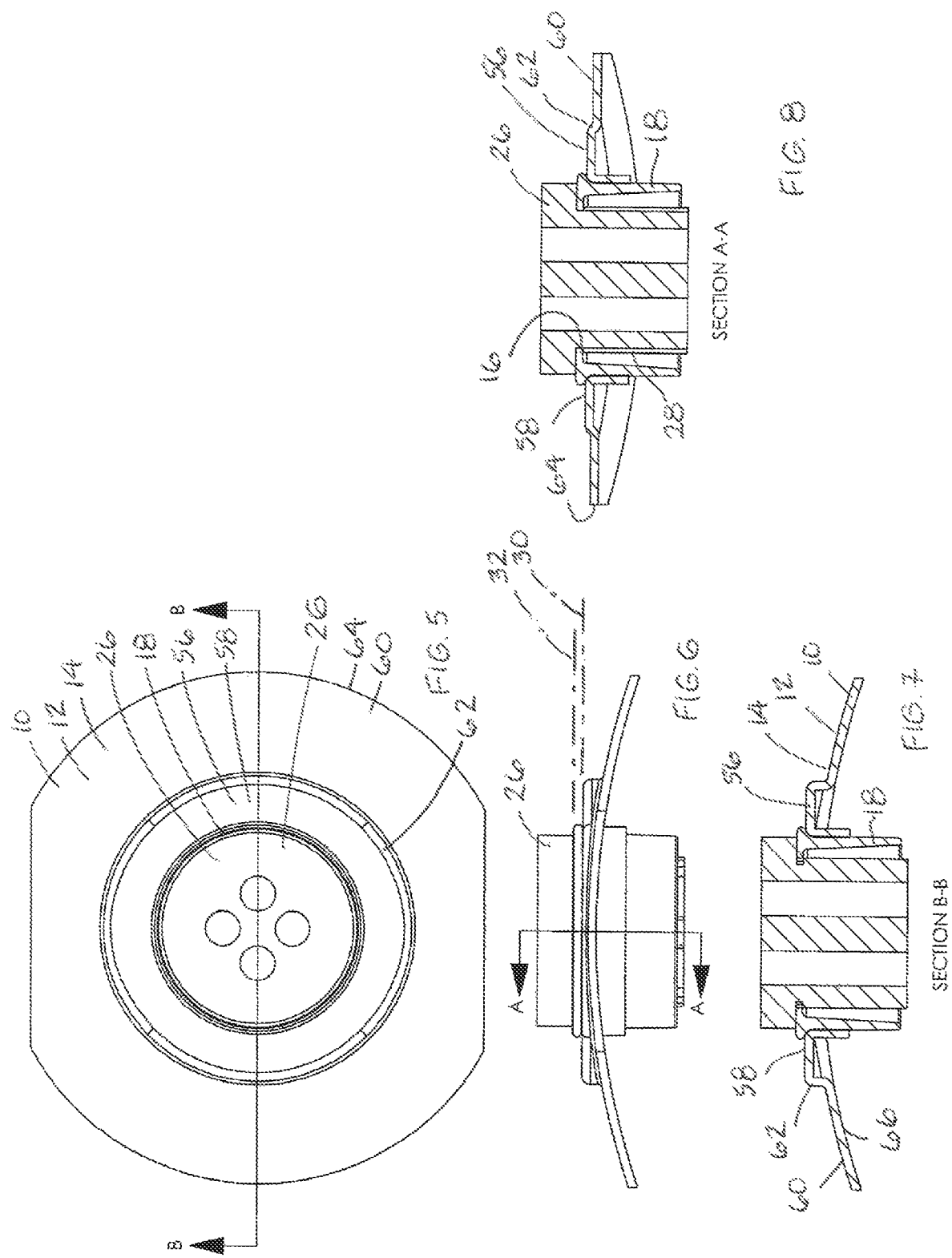

ISOLATION FLANGE

1. TECHNICAL FIELD

The present invention relates to fuel tanks for use in commercial vehicles, and more particularly to the connection of a component secured on the fuel tank. The present invention provides a flange that decreases failure of the fluid tight connection between the fuel tank and the component secured thereon.

2. BACKGROUND OF THE INVENTION

The present invention is particularly intended for use on commercial vehicles, which may include a component received in a component receiving base secured to the side wall of a fuel tank. During drop tests or during harsh environmental driving conditions of a vehicle on which the fuel tank is mounted, the fuel tank side wall may deform which may in turn deform the component receiving base. Deformation of the component receiving base may result in loss of a fluid tight connection between the component and the component receiving base which may result in spilled fuel and a fire or explosion hazard. There is a need, therefore, to provide a fuel tank that will retain a fluid tight connection between the fuel tank side wall and a component secured therein, even during drop tests and harsh environmental driving conditions.

SUMMARY OF THE INVENTION

The present invention relates to an isolation flange for a fuel tank assembly, and a process of manufacturing the same, for use in commercial vehicles, and more particularly, to an isolation flange for a fuel tank assembly that provides a crumple zone positioned between a component receiving base and a wall of a fuel tank, such that the crumple zone insulates the component receiving base from deformation during drop tests and harsh environmental driving conditions to which the fuel tank is subjected.

BRIEF DESCRIPTION OF THE DRAWINGS

FIG. 3 is a side view of the isolation flange of FIG. 1 including a section line A-A extending there through.

FIG. 5 is a top view of one example embodiment of an isolation flange with a component secured therein and including a section line B-B extending there through.

FIG. 6 is a side view of the isolation flange of FIG. 5 and including a section line A-A extending there through.

FIG. 7 is a side view of the isolation flange of FIG. 5 taken along line B-B of the isolation flange of FIG. 5.

FIG. 8 is a cross sectional view of the isolation flange of FIG. 6 taken along line A-A of the isolation flange of FIG. 6.

DETAILED DESCRIPTION OF THE PREFERRED EMBODIMENTS

In prior art mounting configurations, where the mounting base for a component is secured into the wall of a fuel tank, the mounting base is not rigid enough to resist deformation, and therefore not rigid enough to retain a fluid tight seal of a component secured therein, when the fuel tank is subjected to a thirty foot drop test under the requirements of FMCSA 393.67. In particular, the teeth of the mounting base will deform and retract from retaining the component in such a scenario. To reduce such failures, the present invention provides an assembly with two novel features: first, a rigid mounting base is provided that engages the component to secure the component therein, wherein the rigid mounting base includes a thick wall positioned outside the engagement footprint of the component, so as to reduce deformation of the mounting base itself; and second, the rigid mounting base is secured in a flange that is welded to the fuel tank wall, wherein the flange acts as a crumple zone, i.e., a deformation zone that isolates the mounting base from deformation, during drop tests and harsh environmental driving conditions. This isolation allows the component to remain secured to the mounting base in its original rigid position, thereby ensuring retention of the fluid tight seal between the mounting base and the component. This inventive isolation flange will now be described.

Figure 1:
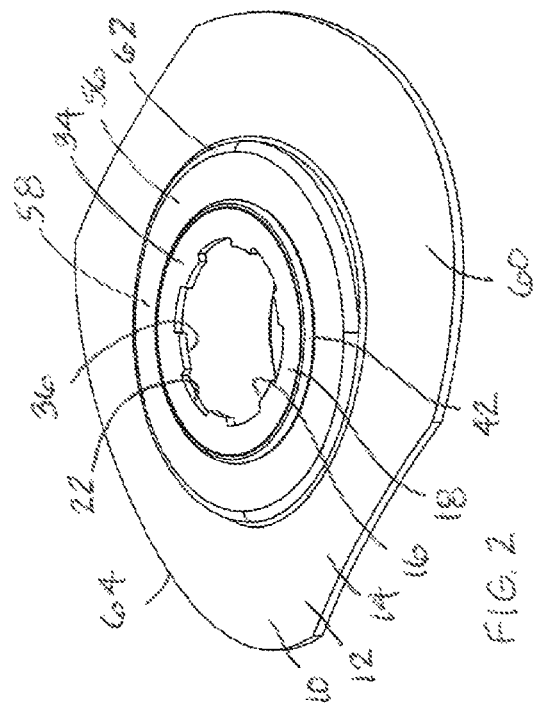
FIG. 1 is a top view of one example embodiment of an isolation flange.
Figure 2:
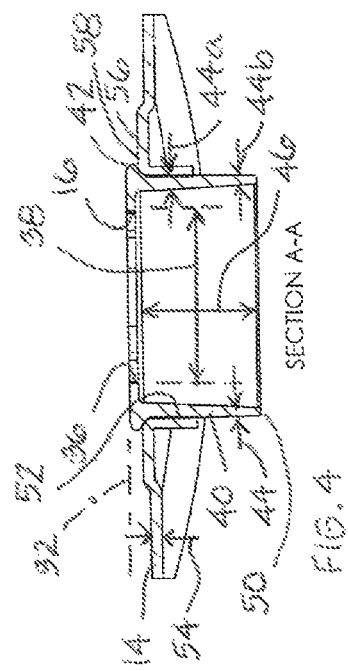
FIG. 2 is an isometric view of the isolation flange of FIG. 1.

FIG. 1 is a top view, and FIG. 2 is an isometric view, of one example embodiment of a fuel tank assembly 10 including a flange assembly 12 having a flange 14 and a six-tooth 16 component receiving mounting base 18 adapted to receive therein a component 26 (FIG. 5), such as a bayonet mounting, that mates with and is secured to base 18 by teeth, or fasteners, 16. In one arrangement, the bayonet mounting 26 may include six teeth 28 (FIG. 8) that are inserted into base 18 through recessed regions 22 positioned between base teeth 16. The bayonet mounting 26 is then rotated slightly so that teeth 28 (FIG. 8) of bayonet mounting 26 are positioned downwardly of and frictionally secured by teeth 16 of mounting base 18. In this manner the bayonet mounting, or component 26, is secured to mounting base, or component receiving base, 18.

Referring to FIGS. 5-8, in one embodiment, component 26 may be a bayonet mounting unit manufactured of plastic that includes a fuel draw tube, a fuel return tube, a level sender unit and a vent. The bayonet component 26 is placed within aperture 36 of top surface 34 of base 18 such that teeth 28 of base 18 move downwardly through recessed regions 22 positioned between teeth 16 of base 18. The component 26 is then turned and snaps into place with component teeth 28 secured underneath base teeth 16.

The top surface of teeth 28 of component 26 are positioned in a single plane 30 (FIG. 6). Similarly, the bottom surface of teeth 16 of base 18 are positioned in a single plane 32, which is parallel to plane 30, and preferably defines the same plane as plane 32, when component 26 is secured on base 18. (In FIG. 6 the planes 30 and 32 are shown parallel but slightly off set for ease of illustration).

Referring to FIG. 1, base 18 includes a top surface 34 that defines or is parallel to single plane 32. Deformation of base 18, and specifically, deformation of all or a portion of top surface 34 or teeth 16 out of plane 32 or out of a parallel position relative to plane 32, may result in failure of the fluid tight seal between component 26 (FIG. 6) and base 18.

This invention provides structure to reduce deformation of base 18 including top surface 34 and teeth 16 out of plane 32. In particular, the present invention provides structurally reinforced zones and structurally deformable zones that work together to isolate top surface 34 and the arrangement of teeth 16 thereon, from deformation so that component 26 may be retained on top surface 34 by teeth 16 while maintaining a fluid tight seal between base 18 and component 26.

Figure 3:
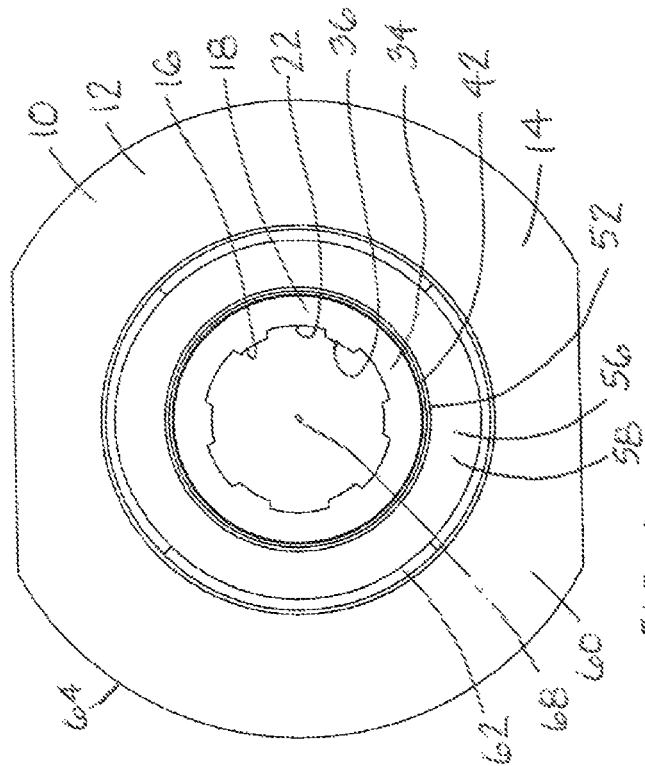
Figure 4:
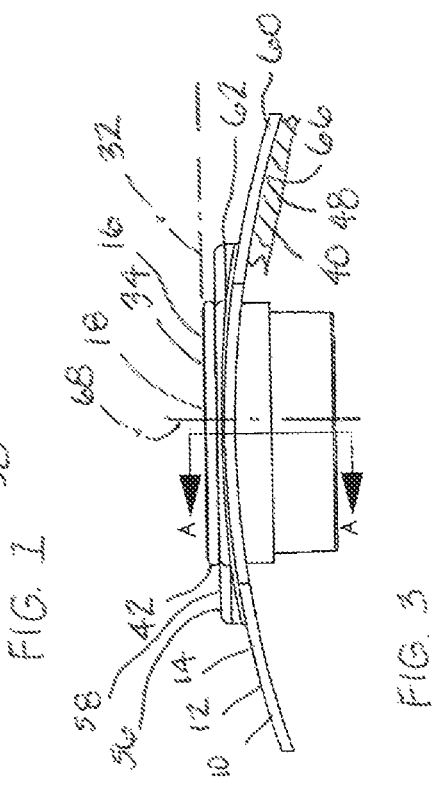
FIG. 4 is a cross sectional view taken along line A-A of the isolation flange of FIG. 3.

Referring to FIGS. 3 and 4, top surface 34 of component receiving base 18 defines aperture 36 that includes teeth 16 positioned there around. Aperture 36 and teeth 16 define a footprint or a width 38 measured parallel to plane 32. Base 18 further includes a downwardly extending side wall 40 positioned around a perimeter 42 of top surface 34 and outwardly of footprint or width 38 of aperture 36 and teeth 16. Sidewall 40 has a thickness 44 measured parallel to plane 32 and a length 46 extending perpendicular to plane 32 that provide rigidity to base 18 so that top surface 34 will remain planar even upon damaging outside forces are imparted to a fuel tank 48 on which base 18 is mounted. Furthermore, base 18 in the embodiment shown is manufactured as a cast part, further providing for rigidity to the base 18. In the embodiment shown base 18 is cast from 369 Aluminum with a side wall thickness 44a adjacent top surface 34 of ¼ inch, and a thickness 44b adjacent a bottom surface 50 of sidewall 40 of 3/16 inch, wherein the thickness 44 of sidewall 40 tapers from top surface 34 to bottom surface 50 of the base 18. Flange 14 may have a wall thickness 54 in a range of $1/25^{th}$ inch to $1/60^{th}$ inch, and in a preferred embodiment, 0.16 inch thickness, substantially less than the thickness 44 of the wall 40 of base 18. The rigid, thick, tapered side wall 40 of base 18, positioned outside footprint 38 of the base, is a structurally reinforced zone that reduces deformation of base 18 during drop tests and harsh environmental driving conditions.

Referring again to FIGS. 1-4, assembly 10 includes flange 14 which defines a base aperture 52 for securing component receiving base 18 therein. Base aperture 52 is positioned on a raised region 56 of the flange 14, wherein raised region 56 defines a top surface 58 positioned parallel to plane 32. Raised region 56 may be defined as positioned vertically upwardly from curved region 60 of flange 14 as measured along a vertical axis 68 (FIG. 3) of the flange. Raised region 56 is separated from a curved region 60 of flange 14, by a transition or sloped region 62 of flange 14. Curved region 60 of flange 14 may define a curvature 66 (FIG. 3) that corresponds to a curvature of side wall 40 of a fuel tank 48 so that flange 14 may be welded to fuel tank side wall 40 completely around a perimeter 64 of flange 14. Transition or sloped region 62 of flange 14 may be created within flange 14 during a stamping process so that sloped region 62 may be defined as a stamped feature of flange 14. Sloped region 62 of flange 14 is a transition region within flange 14 from curved region 60 of the flange, which corresponds to the curved side wall 40 of the fuel tank, to planar top surface 58 of flange 14 that includes aperture 52 which is adapted to receive base 18 therein. Raised region 62 within flange 14 acts as a reinforcement rib so that deformation of flange 14 in curved region 60 of flange 14, is not transmitted to or imparted to, or is reduced in magnitude when transmitted to, top surface 58 of raised regions 56 of flange 14. In other words, outside forces that act upon side wall 40 of fuel tank 48 may cause deformation of the side wall 40 of the tank, and of curved region 60 of flange 14, but sloped region 62 of flange 14 will reduce or prevent the deformation forces reaching top surface 58 of raised region 56 of flange 14, thereby reducing or preventing the deformation of top surface 34 of component receiving base 18 secured therein. Accordingly, sloped region 62 of flange 14, together with the ductile material used to manufacture flange 14, results in an isolation flange 14 that reduces failure of the connection of component 26 to fuel tank 48.

In the embodiment shown, base 18 is positioned within aperture 52 of flange 14 and is welded thereto. Flange 14 may be manufacturing by the process of stamping, and may be manufactured of sheet metal, such as 5052 sheet aluminum. Welding rigid cast base 18, which is manufactured of 369 casting aluminum, to flexible, malleable, or bendable flange 14 manufactured of 5052 sheet aluminum, may result in some weld failures. In the case of a weld failure at this stage in the manufacturing process, base 18 and flange 14 may be discarded before flange 14 is secured to a fuel tank 48. In this manner, only base 18 and flange 14 are discarded instead of the entire fuel tank 48. If the weld between base 18 and flange 14 is fluid tight and strong, then flange 14 may be welded to a fuel tank side wall 40. Fuel tank side wall 40 may be manufactured of 5052 sheet aluminum, similar to flange 14, so that welding flange 14 to side wall 40 is a relatively simple and consistent process, resulting in relatively few failed welds. In this manner the present invention provides for an advantage over the prior art in that the assembly process of the present invention provides for an easy weld of flange 14 to fuel tank wall 40 because the fuel tank wall 40 and the flange 14 are manufactured of the same sheet material, such as sheet aluminum, providing a high percentage of high quality welds.

The flange 14, which includes base 18 secured therein, is a structurally deformable zone that deforms during drop tests and harsh environmental driving conditions so that the flange 14 itself will deform and will simultaneously isolate the base 18 from deformation, thereby reducing deformation of base 18 during drop tests and harsh environmental driving conditions. In one embodiment, flange 14 is manufactured of a material having a material characteristic of Elongation at Break of at least ten percent, and approximately twelve percent in a preferred embodiment. Base 18 is manufactured of a material having a material characteristic of Elongation at Break of at most five percent, and approximately three point five percent in a preferred embodiment. The material of flange 14 may also be referred to as having a modulus of elasticity greater than the modulus of elasticity of material of base 18. The material of flange 14 may also be referred to as having a ductility greater than the ductility of material of base 18. Flange 14 may buckle, crumple, bend, flex, warp, twist, ripple, or otherwise deform in shape, while allowing isolation of top surface 34 and teeth 16 of base 18 from such deformation so as to retain top surface 34 and teeth 16 its original, rigid, planar orientation. Flange 14 may be described as being manufactured of a material that is more deformable or bendable than the material of which rigid base 18 is manufactured.

Accordingly, Applicant's inventive flange assembly provides a flexible isolation flange with a rigid, inflexible base secured therein, such that the flexible isolation flange will deform when outside forces act on fuel tank 48 and reduce or eliminate such forces from reaching base 18. The inventive flange assembly also provides for a reduced number of fuel tanks that must be scrapped due to bad welds, because the inventive flange assembly manufacturing process provides for the most difficult weld to take place during assembly of the smaller priced base and flange, prior to attachment of the flange/base assembly to a relatively expensive fuel tank. The inventive process results in increased yields of fuel tanks during manufacturing because of the use of two different materials for manufacture of base 18 and flange 14.

FIG. 5 is a top view of one example embodiment of an isolation flange 14 with a component 26 secured therein and including a section line B-B extending there through.

FIG. 6 is a side view of the isolation flange 14 of FIG. 5 and including a section line A-A extending there through.

FIG. 7 is a side view of the isolation flange 14 of FIG. 5 taken along line B-B of the isolation flange of FIG. 5.

FIG. 8 is a cross sectional view of the isolation flange 14 of FIG. 6 taken along line A-A of the isolation flange of FIG. 6

As may be understood from the above description and drawings, the present invention has many advantages over prior art fuel tank flanges. In the above description numerous details have been set forth in order to provide a more thorough understanding of the present invention. It will be obvious, however, to one skilled in the art that the present invention may be practiced using other equivalent designs.

I claim:

1. A fuel tank assembly, comprising:
a flange manufactured of a material having a flange Elongation at Break value; and
a base secured to said flange, said base adapted to secure a component therein, said base manufactured of a material having a base Elongation at Break value less than said flange Elongation at Break value,
wherein said flange includes a raised region, a curved region and a sloped region positioned there between, said raised region being planar and defining a raised region plane that is parallel to a base plane of a top surface of said base, and
wherein said sloped region defines a reinforced rib extending completely around said raised region.

2. The fuel tank assembly of claim 1 further comprising a fuel tank secured to said flange, said fuel tank manufactured of a material having a tank Elongation at Break value the same as said flange Elongation at Break value.

3. The fuel tank assembly of claim 1 wherein said base includes a top surface having an aperture therein, said aperture defining a plurality of fasteners positioned there around.

4. The fuel tank assembly of claim 3 wherein said aperture of said top surface defines a width, and wherein said base includes a base side wall positioned perpendicular to said top surface and positioned outside said width of said aperture, said base side wall having a thickness greater than a thickness of said flange.

5. The fuel tank assembly of claim 1 wherein said flange Elongation at Break value is at least ten percent, and said base Elongation at Break value is at most five percent.

6. The fuel tank assembly of claim 1 wherein said flange is secured to a fuel tank side wall and wherein said curved region of said flange defines a curvature that corresponds to a curvature of said fuel tank side wall.

7. The fuel tank assembly of claim 1 wherein said base includes base teeth, said assembly further including a component having component teeth, wherein said component is secured on said base by positioning said component teeth against said base teeth.

8. A fuel tank assembly, comprising:
a flange including a base region, a tank connection region and a sloped region extending there between, said base region positioned vertically upwardly from said tank connection region, said base region including a base aperture therein;
a base secured within said base aperture of said base region;
wherein said sloped region defines a reinforcing rib that extends completely around said base region; and
said flange manufactured of a flange material and said base manufactured of a base material, said flange material having a flange material flexibility greater than a base material flexibility of said base material.

9. The fuel tank flange assembly of claim 8 further comprising a component secured within said base aperture.

10. The fuel tank flange assembly of claim 8 wherein said base includes a side wall having a thickness greater than a thickness of said flange.

11. The fuel tank assembly of claim 10 wherein said base includes an aperture sized to secure a component therein, said aperture defining a footprint, and wherein said side wall of said base is positioned outside said footprint.

12. The fuel tank assembly of claim 8 wherein said base material has a base Elongation at Break value less than a flange Elongation at Break value of said flange material.

13. The fuel tank assembly of claim 8 wherein said base region includes a planar top surface having said base aperture therein.

14. A flange assembly, comprising:
a base cast from a base material having a base Elongation at Break value;
a flange stamped from a flange material having a flange Elongation at Break value greater than said base Elongation at Break value, said flange including a base region, a curved region and a sloped region extending there between, said sloped region extending completely around said base region; and
a weld that secures said base to said flange.

15. The assembly of claim 14 further comprising:
a fuel tank formed from a tank material having a tank Elongation at Break value the same as said flange Elongation at Break value; and
a weld that secures said flange to said fuel tank.

16. The assembly of claim 14 further comprising a component secured within a base aperture of said base.

17. The assembly of claim 16 wherein said base aperture defines a footprint and said base defines a base side wall, said base side wall positioned outside said footprint of said base aperture.

18. The assembly of claim 17 wherein said base side wall has a thickness greater than a thickness of said flange.

* * * * *